(12) United States Patent
Lee et al.

(10) Patent No.: US 7,895,104 B1
(45) Date of Patent: Feb. 22, 2011

(54) PRESENTATION AND ANALYSIS OF DOCKET INFORMATION AND FINANCIAL INFORMATION

(75) Inventors: Lewis C. Lee, Spokane, WA (US); Daniel L. Hayes, Spokane, WA (US); Brian J. Pangrle, Spokane, WA (US)

(73) Assignee: IP Street Inc., Spokane, WA (US)

( * ) Notice: Subject to any disclaimer, the term of this patent is extended or adjusted under 35 U.S.C. 154(b) by 133 days.

(21) Appl. No.: 12/245,680

(22) Filed: Oct. 3, 2008

Related U.S. Application Data

(60) Provisional application No. 60/977,629, filed on Oct. 4, 2007, provisional application No. 60/978,088, filed on Oct. 5, 2007.

(51) Int. Cl.
*G06Q 40/00* (2006.01)
(52) U.S. Cl. .......................... 705/35; 705/30
(58) Field of Classification Search .............. 705/10–44
See application file for complete search history.

(56) References Cited

U.S. PATENT DOCUMENTS

| | | | |
|---|---|---|---|
| 7,676,375 B1 * | 3/2010 | Neifeld et al. ............ 705/36 R |
| 2002/0022974 A1 | 2/2002 | Lindh | |
| 2002/0091309 A1 | 7/2002 | Auer | |
| 2004/0181427 A1 | 9/2004 | Stobbs et al. | |
| 2004/0210497 A1 | 10/2004 | Hirayama et al. | |
| 2006/0259321 A1 | 11/2006 | Gabrick et al. | |
| 2006/0271379 A1 | 11/2006 | Resnick et al. | |
| 2007/0078886 A1 | 4/2007 | Rivette et al. | |
| 2008/0077570 A1 | 3/2008 | Tang et al. | |
| 2008/0243786 A1 | 10/2008 | Stading | |
| 2008/0243789 A1 | 10/2008 | Kussmaul et al. | |
| 2008/0243799 A1 | 10/2008 | Rozich et al. | |
| 2009/0012827 A1 | 1/2009 | Avrunin | |
| 2010/0037161 A1 | 2/2010 | Stading et al. | |

FOREIGN PATENT DOCUMENTS

WO    WO2009026193 A2    2/2009

OTHER PUBLICATIONS

Bahlmann, "Automated Patent Evaluation", retrieved on Dec. 12, 2008 at <<http://www.birds-eye.net/article_archive/automated_patent_evaluation.htm>>,Birds-Eye.Net, Mar. 11, 2006.

Giereth, et.al., "A 3D Treemap Approach for Analyzing the Classificatory Distribution in Patent Portfolios", IEEE Symposium on Visual Analytics Science and technology, 2008.

Giereth, "Pat-Viz—Interactive Visualization of Patent Information", retrieved on Dec. 3, 2008 at <<www.heidelberger-innovationsforum.de/fileadmin/_heidelberger/downloads/Praesentationen_Nov07/15_Giereth.pdf >>, Heidelberg Innovation Forum, 2008.

Heijis, "Visualization and text mining of patent and non-patent data", retrieved on Dec. 2, 2008 at <<http://www.treparel.com/>>, ICIC Conference, 2008.

(Continued)

*Primary Examiner*—Frantzy Poinvil
(74) *Attorney, Agent, or Firm*—Lee & Hayes, PLLC

(57) ABSTRACT

Aggregation, analysis, and presentation of financial and docket information in a common interface are described.

22 Claims, 17 Drawing Sheets

OTHER PUBLICATIONS

Kutz, "Examining the Evolution and Distribution of Patent Classifications", IV2004 Conference, London, UK, 2004, pp. 983-988.

Many eyes, "Patent Change Treemap" Retrieved on Dec. 3, 2008 at <<http://manyeyes.alphaworksibm.ibm.com/manyeyes/visualizations/patent-change-treemap>>, Many Eyes, 2007.

Murata, et al., "Using the K-Nearest Neighbor Method and Smart Weighting in the Patent Document Categorization Subtask at NTCIR-6", Proceedings of NTCIR-6 Workshop Meeting, May 15, 2007.

"Patentatlas", retrieved on Dec. 1, 1008 at <<https://atlas.ipb-corporation.com>>, IFI Patent Intellingance, 2008.

"Advanced Patent Document Processing Techniques", retrieved on Dec. 12, 2008 at <<http://www.patexpert.org>> Patexpert.

Publikationen, "M. Giereth", retrieved on Nov. 17, 2008 at <<http://209.85.173.132/search?q=cache:x6EE6gteYksJ:http://www.vis.uni-stuttgart.de/ger/research/pub/authors/author_Giereth-ger.html>>, Publikationen, 2008.

"Thomson Innovation", retrieved on Dec. 15, 2008 at <<http://www.thomsoninnovation.com/>> Thomson Reuters.

Wanner, et al., "Semantic Processing of Patent Documentation", in Poster Proceedings of 1st Int. Conf. on Semantics and Digital Media Technology, 2006.

Wooldridge, et al., "Information Visualization and Presentation" Fall 2005.

Yukawa, et al., "A Fast Patent Classification Method Using the Chi-square Statistic and Its Improvement", retrieved on Dec. 12, 2008 at <<http://www.ir-facility.org/pdf/pair-papers/patentClassification-yukawa08.pdf>> Information Retrieved Facility, 2006.

Innography, Comprehensive Intellectual Property Business Intelligence Datasheet, 2010.

* cited by examiner

EXEMPLARY GRAPHIC/METHOD 1300

1310

| View By Expiration: | Nov XX | Dec XX | Feb XX | Jan XX | | | | 1320 |
|---|---|---|---|---|---|---|
| CALL OPTIONS | Expire at close Fri, XXX, XXX | | | | | |
| Strike | Symbol | Last | Chg | Bid | Ask | Vol | Open Int |
| 20.00 | BIOKD.X | 14.60 | 0.00 | 15.20 | 15.70 | 2 | 2 |
| 22.50 | BIOKX.X | 12.30 | 0.60 | 12.80 | 13.20 | 5 | 129 |
| 25.00 | BIOKE.X | 10.30 | 0.70 | 10.30 | 10.80 | 10 | 172 |
| 27.50 | BIOKY.X | 7.90 | 0.80 | 8.20 | 8.40 | 85 | 2,020 |
| 30.00 | BIOKF.X | 6.20 | 0.50 | 6.10 | 6.30 | 404 | 6,190 |
| 32.50 | BIOKZ.X | 4.40 | 0.50 | 4.30 | 4.50 | 1,365 | 3,139 |
| 35.00 | BIOKG.X | 3.00 | 0.30 | 2.90 | 3.10 | 1,913 | 5,433 |
| 37.50 | BIOKU.X | 1.90 | 0.15 | 1.85 | 1.90 | 2,898 | 2,657 |
| 40.00 | BIOKH.X | 1.15 | 0.05 | 1.10 | 1.20 | 2,503 | 2,175 |

ANALYZE 1340

PRESENTATION AND ANALYSIS OF DOCKET INFORMATION AND FINANCIAL INFORMATION

RELATED APPLICATIONS

This document claims priority to U.S. Provisional Application No. 60/977,629, filed Oct. 4, 2007, and to U.S. Provisional Application No. 60/978,088, filed Oct. 5, 2007. Both of these provisional applications are hereby incorporated by reference.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND

Innovation is a key factor for many companies to succeed in a globally competitive world. Protection of innovation via intellectual property (IP) helps those companies convert innovation into business assets. Today, Intangible assets represent a significant share of the market capitalizations of many of the most successful and innovative companies. Yet, to the business community and many professionals who are not IP legal experts, intellectual property generally, and patents specifically, remain somewhat of a mystery to fully understand, assess, and value.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
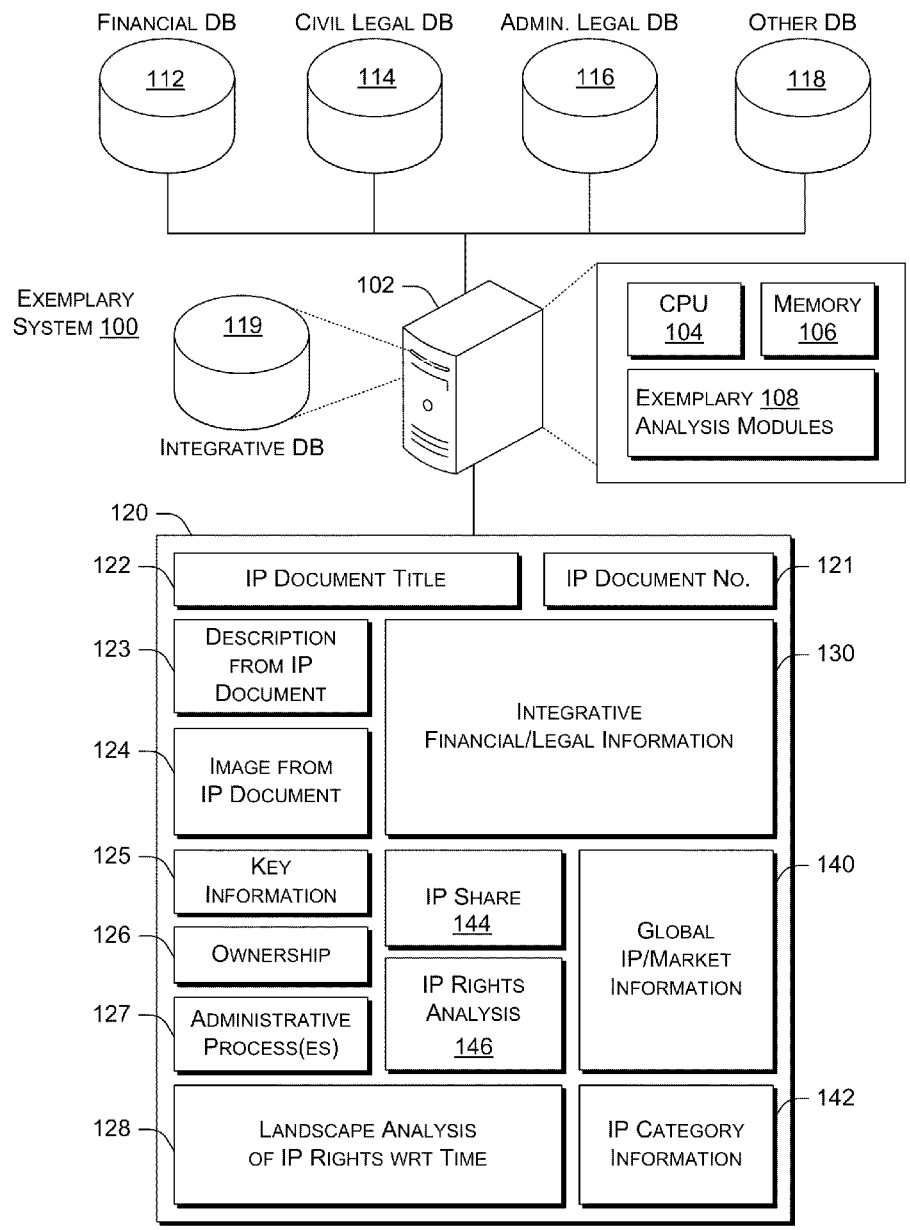
FIG. 1 shows an exemplary system for acquiring and presenting information for an intellectual property document (e.g., intellectual property identification number as assigned by a government agency)

Governments and related agencies, including judicial bodies, play an important role today's marketplace. In addition, organizations exist that provide assistance in mediation and arbitration. Such entities typically maintain dockets of proceedings. As described herein, an exemplary method acquires docket information and relates docket information to financial markets.

EXAMPLE: USPTO

In a particular example, a docket maintained by the United State Patent & Trademark Office (USPTO) is monitored. During monitoring, an event such as a Notice of Allowance of a patent application can trigger an alert. The alert may be issued with financial information such as stock and/or option information for the assignee of the patent application, a competitor of the assignee of the patent application, and/or one or more other parties that may have some financial interest in the docket event.

In another example, knowledge about the underlying process is used to predict a likely date of an event. For example, a patent application is typically assigned to an Art Unit based on the technology field. Knowledge of the behaviors (e.g., prior events, timings of events, backlog, number of examiners, etc.) of the Art Unit can then be used to predict timings of events for a particular patent application. Such information can be presented in conjunction with financial information such a stock price.

An exemplary analysis may occur as to the trend of stock price and the likely impact of a predicted event. In general, issuance of a patent occurs after a Notice of Allowance and both of these events can have a positive impact on stock price of an assignee. Further, such events may have an impact on one or more other parties (e.g., competitors, suppliers, customers, etc.). An exemplary method can recommend action with respect to the stock and/or options of a company based on, for example, the nature of a docket event, the predicted timing of an event, current trends in the stock/options, past information with respect to effect of a Notice of Allowance and/or issuance of a patent on the stock/options, etc.

EXAMPLE: LITIGATION DOCKET (e.g., patent litigation)

While the foregoing example is for a so-called patent application prosecution docket, an exemplary analysis may occur for a litigation docket or other type of docket. A particular example includes monitoring a patent litigation docket in a court (e.g., US Federal District Court, US Appellate Court, etc.) and issuing an alert upon an event. The alert may be issued with financial information such as stock and/or option information for one or more parties involved in the litigation (e.g., typically an assignee of the patent) and/or one or more other parties that may have some financial interest in the litigation docket event.

As mentioned with respect to the USPTO, courts also have behavior that can be predictable to varying degrees. For example, United States District Court for the Eastern District of Virginia has particular local rules that have led to the name "Rocket Docket". During the 1960s, Judge Albert V. Bryan Jr. ran the Alexandria court, often ruled cases on the spot after motions were argued. The court earned the nickname, the "rocket docket", for the speed and efficiency for which it processes its cases. Since 1997, the court has processed civil cases the fastest of the 94 federal districts, and eighth fastest in dealing with criminal cases. Thus, an exemplary method can apply such knowledge to a docket to predict with some degree of certainty timings of docket events.

In general, in the United States, litigation dockets are available from the PACER Service Center is the Federal Judiciary's centralized registration, billing, and technical support center for electronic access to U.S. District, Bankruptcy, and Appellate court records (http://pacer.psc.uscourts.gov/). It includes Digital Audio Recordings Pilot, Federal Case Statistics, Policies and Procedures, Written Opinions, and other information.

An exemplary method can recommend action with respect to the stock and/or options of a company based on, for example, the nature of a docket event, the predicted timing of a litigation docket event, current trends in the stock/options, past information with respect to effect of a docket event on the stock/options, etc.

EXAMPLE: FERC (Energy Regulation)

In another example, a docket of the Federal Energy Regulatory Commission (FERC) is monitored for events. A Website at http://elibrary.ferc.gov/idmws/docket search.asp provides docket information for energy related matters. In addition, an option exists to "eSubscribe" to a docket. An exemplary method may use an electronic subscription, a crawler, a docket number, etc., to uncover docket information for a company or companies. For example, a word search of the publicly traded company AVISTA, uncovers hits. A docket number such as ER08-2-000 may be selected, which pertains to electric rate filing (see, e.g., http://www.ferc.gov/docs-filing/eLibrary/docket-prefix.asp for explanation of prefixes). This docket is entitled "Avista Corp and NorthWestern Corp submits a non-confirming Long-Term Service Agreements, FERC electric Rate Schedule 484 and FERC Electric Rate Schedule 248 under ER08-2". This matter is for an "Application/Petition/Request Tariff Filing". Other matters exist, for example, as the rates.

In another example, the docket number EL00-95 is entered, which pertains to "Miscellaneous Formal Filings Related to Electric Power" for San Diego Gas & Electric Company v. Sell. One item filed by CONSTELLATION POWER SOURCE, INC is entitled: "Complaint alleging that the markets for energy & ancillary services operated by the California Power Exchange Corp & the California Independent System Operator Corp are not workably competitive & that the prices in those markets are unjust & unreasonable". While specific information in documents may be confidential, other information such as the filing of a document is publicly available.

An exemplary method can acquire information from a docket such as the FERC docket and then issue an alert. An exemplary method can recommend action with respect to the stock and/or options of a company based on, for example, the nature of a docket event, the predicted timing of a docket event, current trends in the stock/options, past information with respect to effect of a docket event on the stock/options, etc.

EXAMPLE: FDA

The FDA maintains a site at http://www.fda.gov/ohrms/dockets/ that pertains to various dockets. For example, consider the following docket information 2007P-0310: Alkaline and Earth Alkaline Citrates and Osteoporosis; Health Claim Petition by the company Immunotec, Inc. An acknowledgment occurred on Aug. 1, 2007 and the FDA responded as follows on Aug. 9, 2007:

RE: Petition for a health Claim Stating that Alkaline and Earth Alkaline citrates Minimizes the Risk of Osteoporosis Dear Dr. Dröge:

This letter is in reference to the subject health claim petition received by the Food and Drug Administration (FDA or the agency) on Apr. 23, 2007, in which you requested that the agency authorize a health claim with respect to alkaline and earth alkaline citrates and osteoporosis. The petition was submitted pursuant to section 403(r)(5)(D) of the Federal Food, Drug, and Cosmetic Act (the act) (21 U.S.C. 343(r)(5) (D)). On May 3, 2007, we informed you that the petition was undergoing initial FDA review.

We have completed out initial review of the petition and are filing it as specified in section 403(r)(4)(i) of the act (21 U.S.C. 343(r)(4)(i)), on Aug. 1, 2007. Within 90 days of the filing date FDA will either publish a proposed regulation authorizing use of the health claim or deny the petition. We have calculated that date to be Oct. 30, 2007. Denial may be made by FDA action or by lack of FDA action, in which case the petition shall be deemed to be denied unless an extension is mutually agreed upon by FDA and the petitioner.

Please feel free to contact Dr. Jillonne Kevala at 301-436-1848 if you have questions concerning this petition.

From this example, information as to timings exist which can be used to assess market positions with respect to stock/options in the submitted company and/or one or more companies that may have a financial interest in a forthcoming docket event.

An exemplary method can acquire information from a docket such as the FDA docket and then issue an alert. An exemplary method can recommend action with respect to the stock and/or options of a company based on, for example, the nature of a docket event, the predicted timing of a docket event, current trends in the stock/options, past information with respect to effect of a docket event on the stock/options, etc.

EXAMPLE: SEC

A database exists for Federal Securities Rulings including SEC Docket and Federal Securities Law Reporter Selected Releases. In this database, the SEC Docket offers more than 20 years of SEC releases, rulings, opinions and official Commission actions. Coverage includes proposed rule-making changes, final rules, interpretative releases accounting matters and self-regulatory and administrative decisions.

An exemplary method can acquire information from a docket such as the SEC docket and then issue an alert. An exemplary method can recommend action with respect to the stock and/or options of a company based on, for example, the nature of a docket event, the predicted timing of a docket event, current trends in the stock/options, past information with respect to effect of a docket event on the stock/options, etc.

DOCKET IN GENERAL: Rulemaking and Other Decisions

The United States government answers the question "What is a Docket?" as follows:

A docket serves as the repository for documents or information related to an Agency's rulemaking activity. Agencies most commonly use dockets for rulemaking actions, but dockets may also be used for various other non-rulemaking activities. The docket generally consists of the materials specifically referenced in the Federal Register document, any public comments received, and other information used by decision-makers or otherwise related to the Agency rulemaking activity, such as supporting analyses. When an Agency announces a rulemaking action in the Federal Register, the Agency may create a docket to accumulate materials throughout the rulemaking's lifecycle. Some Agencies maintain their dockets electronically with access via the Internet, while other Agencies retain hard copies of materials submitted to their docket.

Regulations.gov contains the rulemaking dockets of select participating Departments and Agencies. If you wish to view the docket for a particular rulemaking of a non-participating Department or Agency, the Federal Register publication for that rulemaking will describe the methods through which the docket can be viewed. Any comments you submit to an Agency may be made available for public inspection, copying, and dissemination via the paper and/or electronic docket.

As described herein, dockets include rulemaking as well as decision making dockets (e.g., patentability, rates, product claims, etc.). Dockets for a political body may also be used (see, e.g., "THOMAS" for US legislative action http://thomas.loc.gov/). Below, particular examples pertain to patent prosecution dockets and patent litigation dockets, however, such techniques can be applied to any of a variety of dockets (e.g., within the US or anywhere around the world). Further, financial markets may include those in the US and/or those around the world.

Across the globe, various mechanisms exist for recognizing or granting rights for intangibles such as inventions, creative expressions, symbols of goodwill, etc. Inventions are typically protected using patents, creative expressions are typically protected using copyrights and symbols of goodwill are typically protected using trademarks (e.g., including trade dress and the like).

Various exemplary methods, systems, devices, described herein relate to intellectual property and information germane to intellectual property, especially for purposes of taking action with respect to financial markets.

FIG. 1 shows an exemplary system 100 for acquiring and presenting information for an intellectual property document (e.g., intellectual property identification number as assigned by a government agency). The system 100 includes a computing device 102 that can access information such as information in the databases 112, 114, 116, 118. The computing device 120 includes a CPU 104, memory 106 and one or more analysis modules 108 for analyzing information. In the example of FIG. 1, information is available from a financial database 112, a civil legal database 114, an administrative legal database 116 and/or one or more other databases 118.

The computing device 102 is configured to access information, such as information in the databases 112, 114, 116, 118, over one or more networks. In the example of FIG. 1, information is available from a financial database 112, a civil legal database 114, an administrative legal database 116 and/or one or more other databases 118. The financial database 112 can provide stock information and optionally other financial information such as options, bonds, etc. In general, such information is available in near real-time along with historic information. The civil legal database 114 can provide information as to litigation. One example database is the PACER database that tracks litigation dockets for both civil and criminal actions for various jurisdictions in the United States, although other legal databases may be used. The administrative legal database 116 is representative of a database associated with an administrative agency. For example, the administrative legal DB 116 may be associated with the U.S. Patent & Trademark Office. While the term "legal" appears in describing the administrative database, an administrative agency may have a database with non-legal information or quasi-legal information as well, which is contemplated herein. Many administrative agencies make determinations as to rights such as patent rights. Other administrative agencies include FDA, FERC, ITC, SEC, and the like. Other databases 118 may include databases of marketing data, country data (e.g., CIA database), etc.

The information collected in the databases may be of domestic or international scope. For instance, the financial DB 112 may represent databases that hold stock and financial information for US companies, or for non-US companies. Further, the administrative legal DB 116 may represent other sources of information, such as European patent information available from the European Patent Office, or Japanese patent information available from the Japanese Patent Office. Essentially, the computing device 102 may draw from any number of US or world based sources of financial, legal, and IP related information.

The computing device 102 acquires information from the one or more databases 112-118, aggregates the information, and assesses that information via the analysis modules 108. Once processed, the computing device 102 stores the aggregated and analyzed information in an integrative database 119, which allows accessibility to portions or all of the aggregated information.

The computing device 102 is further configured to present the information graphically as indicated by the graphic 120. The graphic 120 may be a printed page or displayed using a display device (e.g., associated with a computer, a terminal, etc.). The graphic 120 consists of a collection of informational items arranged on a page to convey visually certain aspects of the underlying IP asset, such basic information, key statistics, scope of IP rights, and financial information of the asset owner and how the IP related events may impact financial or operational aspects of the asset owner. The graphic 120 may consist of any number of informational items. In certain implementations, the number and arrangement of the items may be configurable by users. For instance, a service hosted on the computing device 102 may allow a user to select from a menu of possible items and arrange those items on the graphic 120. Examples of possible graphics are shown and discussed below. However, these are merely representative, as other graphics may be used to convey the information.

In the example of FIG. 1, the graphic 120 is for an intellectual property document such as a patent or a patent application. In general, such documents have a serial number and/or other identifying number 121. The graphic 120 includes information germane to the document identified by number 121. While a number is stated, the identifier can be letters, numbers, symbols, a combination, and so forth.

In the example of FIG. 1, the graphic 120 includes a title 122, a description from the document 123, an image from the document 124, key information from the document 125, ownership information 126, information about administrative proceedings 127, landscape analysis of intellectual property rights or applied for rights with respect to time 128, integrative financial and legal information 130, global IP and/or market information 140, IP classification and/or category information 142, IP share for an owner 144, and IP rights analysis 146. The graphic 120 is provided as an example; other graphics may have less or more information.

Figure 16:
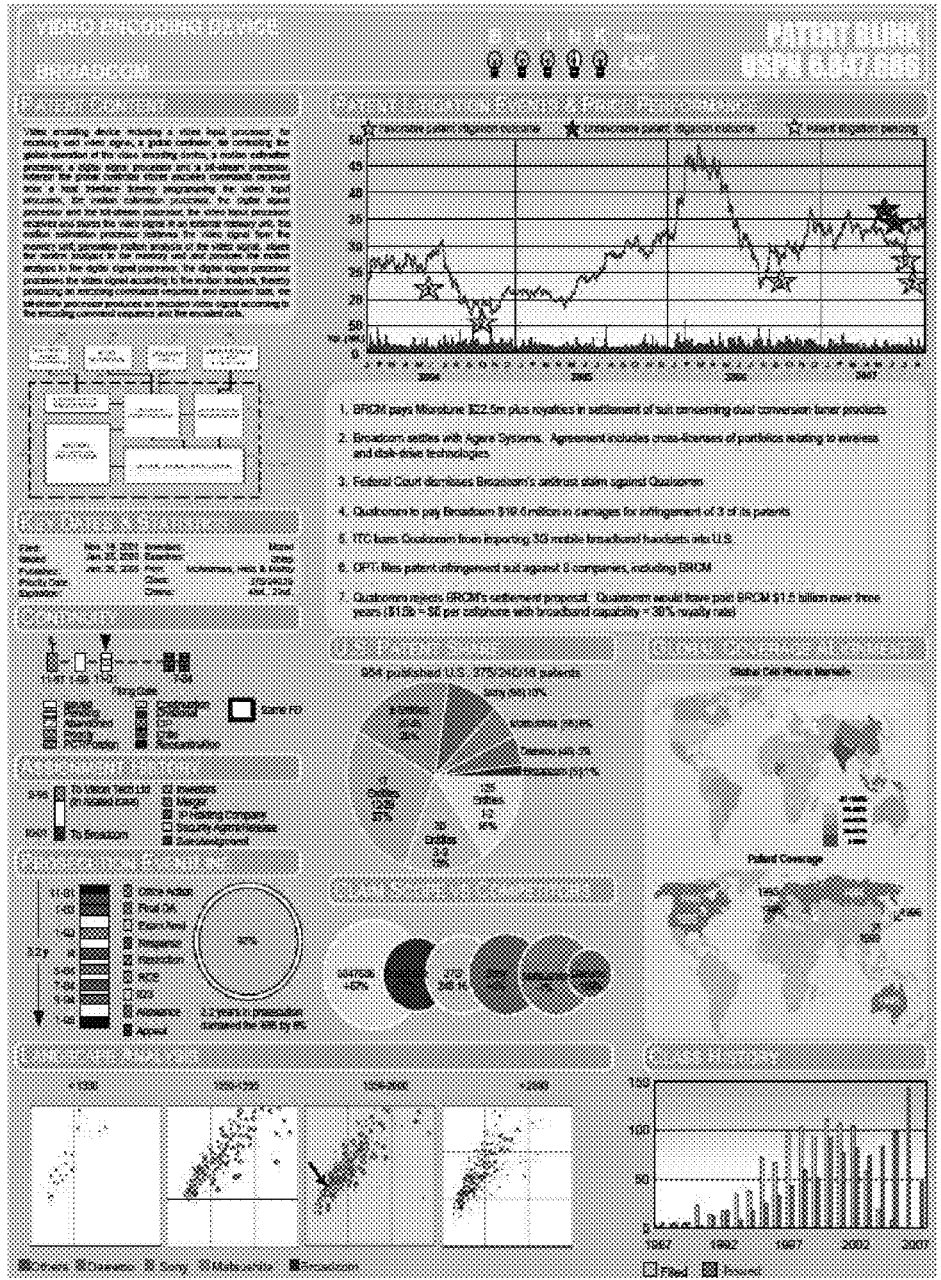
FIG. 16 shows an exemplary graphic that presents information based on searches using information from a single patent.

FIG. 16 shows an example document 1600 that exhibits one particular implementation of informational items that correspond to informational items of the graphic 120 of FIG. 1. In this illustrated example, the document is generated for an IP asset in the form of a U.S. patent. While there are many ways to depict certain informational items, FIG. 16 provides one set of example items that convey visually certain aspects of the underlying IP asset. Examples of the various items will now be described with reference to both FIGS. 1 and 16.

The title area 122 of the graphic 120 is reserved for the title of the document as well as other general data about the document. For instance, the title area 122 of a graphic generated for a patent document may include the inventor name(s) or the assignee of the patent. For a trademark document, the title area 122 may include the assignee of the trademark or the class of goods and services.

The description 123 may include a brief summary of the asset covered by the IP document. In the case of a patent, the description 123 may be the abstract or summary portion of the document. Alternatively, it may be one of the claims, or selected text from the detailed description section of the patent document. In the case of a trademark, it may be a description of the goods or services.

The image 124 provides a visual of the asset being protected by the IP. For a patent, the image 124 may include an illustration from the patent document, such as one of the figures. For a trademark document, the image 124 may include an image of the mark.

The key information 125 is provided to allow the system administrators to designate certain data for inclusion on the graphic. For a patent document, such key information may include a filing date of the application, an issue date of when the patent issued, a publication date, any priority dates, inventor name(s), the US Examiner who examined the patent application, the law firm handling prosecution of the patent, the class within which the Patent Office classified the invention, a claim count (e.g., total claims, independent claims, etc.), the art unit examining the application, the allowance rate of the art unit, other related patents or applications, key references cited during prosecution, and so forth. Similar information may be provided for other IP assets, such as trademarks and copyright registrations.

The information used to populate the title 122, description 123, image 124, and key information 125 may be retrieved from one or more databases. For instance, much of this information may be found at an administrative legal DB 116 maintained by the U.S. Patent and Trademark Office. Alternatively, this information may be retrieved from other commercial sources, such as services promoted by Thomson®, Lexis/Nexis®, and Google®.

The ownership area 126 is provided for a graphic showing the chain of ownership from the time of filing to the present. For an IP document, such as a patent, this area visually depicts assignment data retrieved from the administrative legal DB 116 of the U.S. Patent and Trademark Office.

The administrative process area 127 concerns key data pertaining to how the IP asset was formed. Consider the context of a patent document. When securing a patent, an applicant first files a patent application with the U.S. Patent and Trademark Office, where it is examined. During the examination process, a record is created detailing the Examiner's review of the application and any responsive comments or changes to the patent application made by the applicant. For instance, the Examiner often rejects the initial application on the grounds that the invention as claimed is not novel or is obvious in view of that which is already known in the field of technology. The Examiner cites prior art references and submits arguments as to why the invention as claimed should not be allowed. In response, the applicant commonly submits rebuttal arguments and may on occasions amend the claims to change their scope in an effort to persuade the Examiner that the application should be allowed. This process is called "patent prosecution" and the record created is typically referred to as the "file wrapper history" or simply, "file history". During this process, the scope of the IP asset may change and this scope change often has an impact on the value of the ultimate IP asset.

The computing device 102 retrieves the file history (or other administrative record) from the U.S. Patent and Trademark Office (or other appropriate agency) or from a third party supplier. The analysis modules 108 classify and extract key portions of the file history and store them in the memory 106. For instance, in the context of patents, the analysis modules 108 may identify claims, amendments to the claims, arguments made by the Examiner, rebuttal arguments advanced by the applicant, key references, excerpts from those references, pertinent filings or admissions (e.g., terminal disclaimers, information disclosure statements, etc.), reasons for allowance, and so forth. Various forms of analysis (e.g., statistical, semantic, etc.) may be performed on the file history extracts stored in the memory 106 to provide key insights into the formation of the IP asset.

The administrative area 127 provides a graphic that visually conveys to the reader how the IP asset progressed during the administrative period (e.g., during patent prosecution) and how that process may have affected the scope of the IP asset. The graphic is intended to convey at a glance whether the IP assets scope changed significantly or not during the administrative process. Further, it is intended to reveal whether the process involved many interactions with the agency or a few, as a proxy for how clean or messy the file history, which often plays a role in whether the asset owner chooses to assert the asset in litigation or offer it for licensing. One example graphic is shown in FIG. 16.

The landscape analysis 128 is an area that visually conveys information pertaining to how the IP asset fits within a larger context. The landscape may be directed to technology, or a company's portfolio, or to one or more competitors portfolios, or to a particular geographical region, or to any number of contexts. In the example of FIG. 16, the landscape analysis 128 is directed to a landscape of independent claims found in patents within the relevant classification.

The integrative financial/legal information area 130 is provided prominently on the graphic 120, in the upper right hand quadrant. It provides one or more visual cues to correlate certain legal events or transactions with certain financial parameters. In one example shown in FIG. 16, the integrative financial/legal information area 130 includes a stock chart showing the historical stock performance of the company that owns the IP asset over a period of time (e.g., week, month, quarter, year, multiple years, etc.). Overlaid on this chart are indicators showing related legal events, such as litigation events, patent issuance events, settlements, licensing transactions (if known), and so forth. This information is intended to convey whether certain legal events had any impact on the stock performance of the company. It is noted that other financial data and other events may be correlated in this space on the graphic 120 to allow the reader to assess quickly whether there has been a financial impact on the company due to a legal event.

The global IP/market information area 140 is provided to correlate market data with IP-related legal aspects. For instance, in one implementation, the global IP/market information area 140 visually conveys market data about a product being protected, in part, by the corresponding IP asset. As an example, suppose the graphic 120 is for a U.S. Patent covering a communications chip used in cell phones. Here, a world map may be shown with different regions of the world color coded to exhibit different cell market growth rates (or penetration rates, or sales figures, or other market data). Correlated with this view is another view of how well the IP asset maps to those regions. In one example, a second world map is juxtaposed with the first one and shows through different colors those regions in which the IP asset is protected by patents. In other implementations, such as those involving an interactive UI, the two world maps may be consolidated, and the user can hover over the various regions to learn whether the market data and whether IP rights for this asset extend to the selected region.

The IP category information area 142 provides information items pertaining more generally to IP data relevant to IP document. For instance, the area 142 may provide information about the class within which the IP document is assigned. It may alternatively provide information about the group art unit within which the IP document was examined, or the family tree showing other related IP documents, or IP filing rates in this particular technology worldwide. One example is shown in FIG. 16, where the history of application filings and patent issuances for the relevant class are depicted.

The IP share area 144 contains information items derived from analysis of ownership of IP documents within a particular technology area or class of the IP document being assessed. For instance, this area 144 may provide a breakdown of ownership of the IP documents in a particular class at the U.S. Patent and Trademark Office to which the subject IP document belongs. As shown in FIG. 16, this item may be a pie chart showing the percentage ownership of the top holders of IP documents in the class to which the subject IP document belongs.

The IP rights analysis area 146 is an area reserved for results of an analysis of the scope of rights attached to the IP document. In the context of patents, the scope of a patent document is dictated by the scope of the claims. Thus, the analysis is performed on the claims of the IP documents, and a graphical representation of scope is generated for presentation. In FIG. 16, for example, there is an overlapping set of circles that correlate to the scope of the IP document relative to other IP documents.

The graphic 120 produced by the system 100 may be used in many contexts. Financial professionals may use the graphic 120 and other higher level analyses to investigate the ties between financial aspects of a company and that company's IP portfolio. IP professionals may use the graphic 120 as a portfolio tool to analyze their own portfolios, as well as others (e.g., competitors, acquisition targets, etc.). IP professionals may further use the graphic 120 in transactions, as well as to assess opportunities in geographical regions or technology sectors.

It is further noted that FIGS. 1 and 16 present merely one possible layout and format. The graphic 120 may consist of more or less items than shown in these figures. Moreover, other graphical items may be substituted in place of the ones described and discussed above in the exemplary context.

Figure 2:
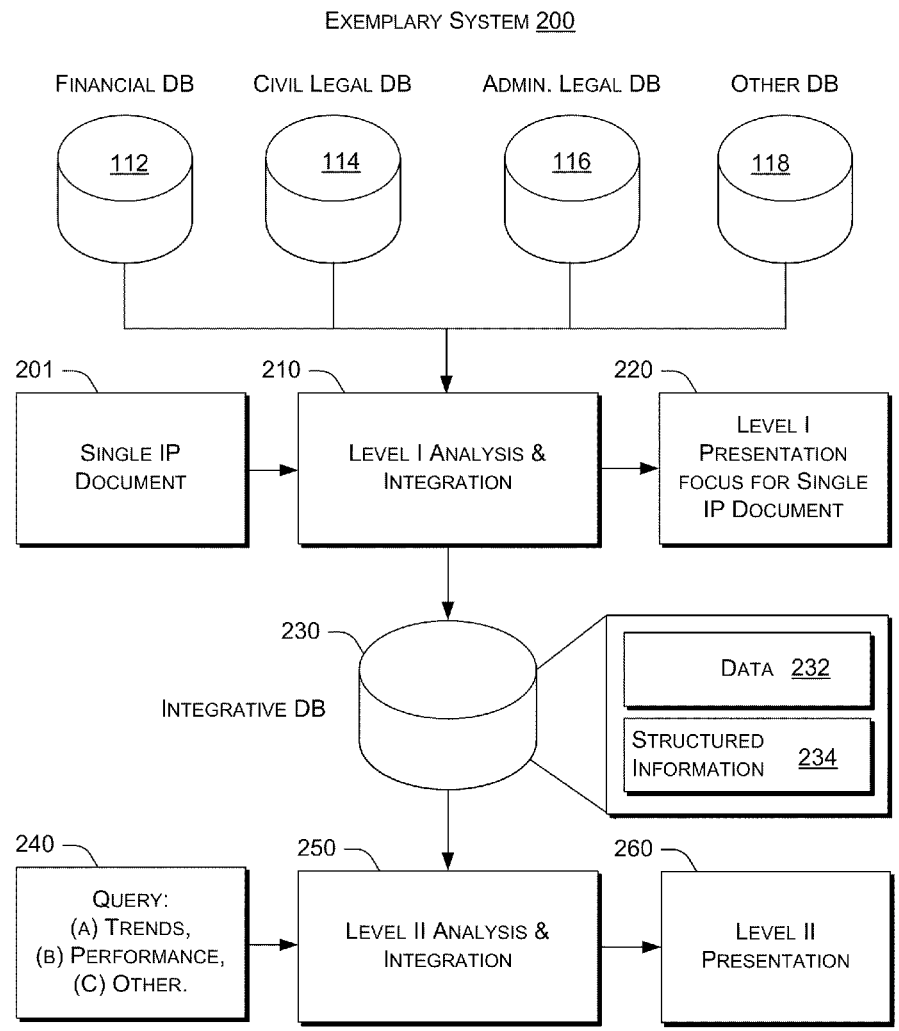
FIG. 2 shows an exemplary system for performing a first level analysis and a second level analysis based on a plurality of first level analyses.

FIG. 2 shows an exemplary system 200 for performing a first level analysis and a second level analysis based on a plurality of first level analyses. The exemplary system 200 may be implemented in part, for example, by the computing device 102 and the analysis modules 108 shown in FIG. 1. In the example of FIG. 2, a single IP document 201 is provided and a level I analysis 210 is performed to integrate information from various fields (e.g., financial, legal, administrative, etc.). Level I presentation results 220 that focuses on the single IP document are produced as a result of the level I analysis 210.

Information associated with the single IP document 201 is stored in an integrative DB 119. Information may be data 232 and other information 234, typically structured for ease of access and relationships for purposes of queries. In general, the DB 119 includes information for a plurality of IP documents. For example, the DB 119 may include information for patents and patent applications in the US and Europe for a particular class (US and corresponding European class) filed and/or issued between the years 1980 and present. It may further include the file histories or other agency records pertaining to the IP documents. The integrative DB 119 may be implemented as part of memory 108 in FIG. 1, or as a separate database accessible by the computing device 102.

A level II analysis commences with a query 240, for trends, performance, etc., for example of an owner of the IP rights associated with the single IP document 201. The level II analysis and integration 250 accesses information in the DB 119 and generates a level II presentation 260. A level II presentation 260 may present information based on a portfolio analysis for a company. Other types of analyses are also possible, for example, inventor, examiner, former assignee, country, competitor, etc. This level II presentation 260 may be presented in near real-time to the user submitting the query, or alternatively stored in the integrative DB 119, or in other memory, for later retrieval and presentation to the user or another user submitting a similar query.

Figure 3:
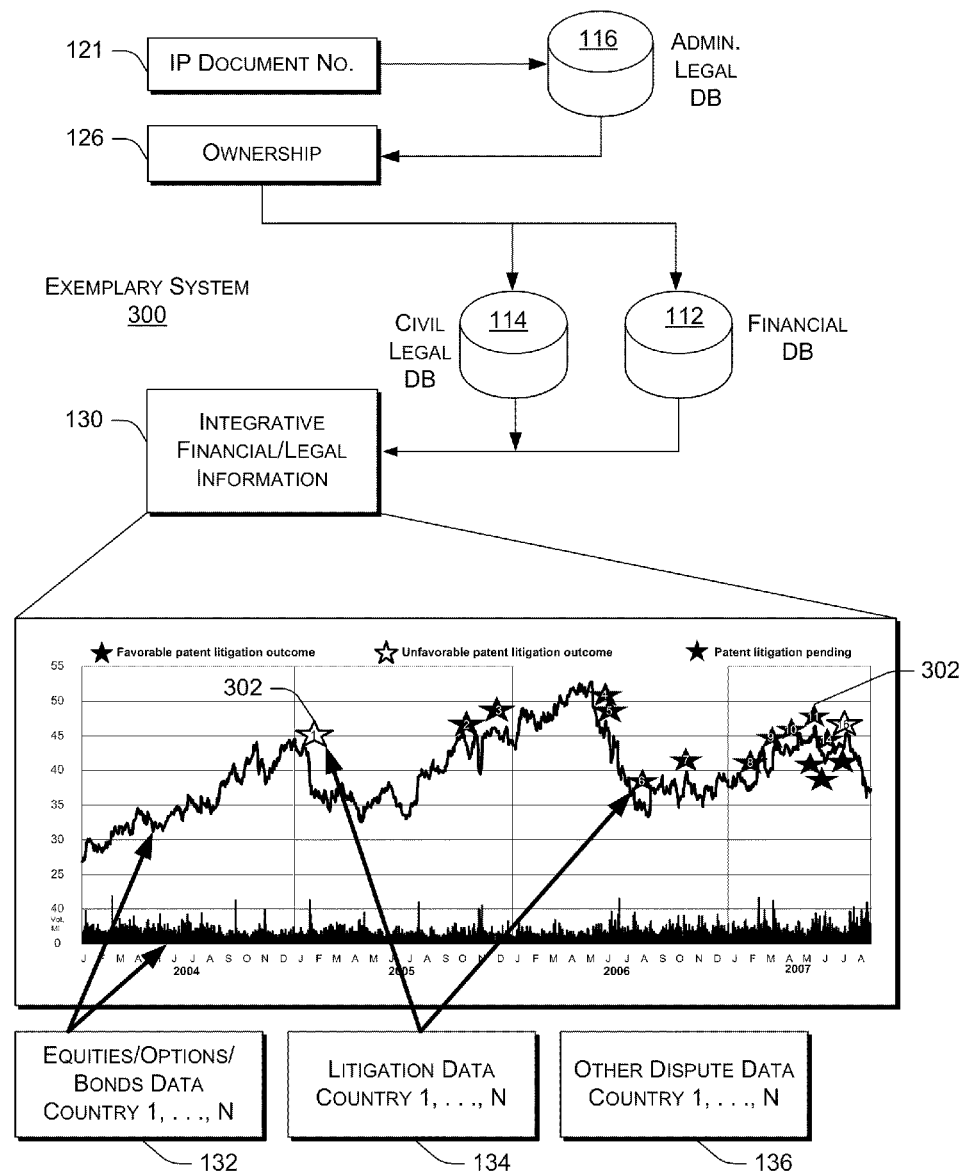
FIG. 3 show an exemplary method for integrating financial and legal information based on information found in an intellectual property document.

FIG. 3 shows an exemplary system and method 300 for integrating financial and legal information based on information found in an intellectual property document. According to the example of FIG. 3, an IP document identifier 121 is provided and used to acquire information from a database 116 where the information includes ownership information 126. The ownership information 126 is then entered into a civil legal database 114 and a financial database 112. Information from these two databases is integrated to provide a graphic 130. In the example of FIG. 3, the graphic 130 includes equity information 132 (e.g., stock price and trading volume over time) and IP legal information. Such IP legal information may include litigation information in the United States 134 and optionally foreign litigation information 136. Litigation information is typically for disputes in a court (e.g., IP litigation cases being argued in district courts, appellate courts, and agency actions, such as those before the International Trade Commission), however, information for other disputes may be acquired (e.g., mediation, arbitration, etc.). The IP legal information may further include events pertaining to the issuance of new patents or the expiration of old patents. In the graphic of FIG. 3, the IP legal information is illustrated as star-shaped indicia 302 overlaid on the date when the event occurred. In this manner, the IP legal information is correlated temporally with the equity information 132 to reveal whether any of the IP events had an impact on the company's stock movement.

Figure 4:
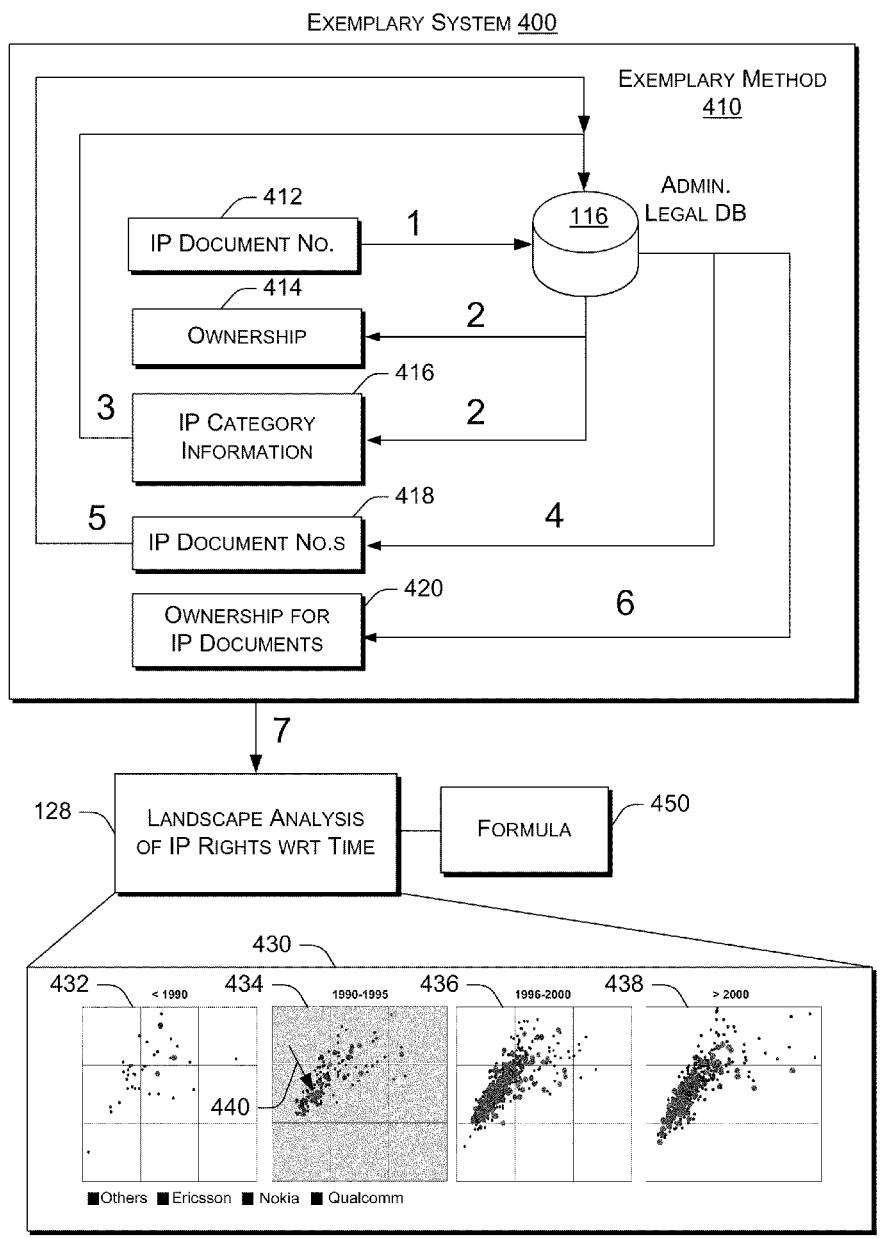
FIG. 4 shows an exemplary method for a landscape analysis of intellectual property rights.

FIG. 4 shows an exemplary system 400 for landscape analysis of intellectual property rights. The system 400 may be implemented, for example, by the computing device 102 from FIG. 1. A method 410 is executed by the system 400 and commences with entry of an IP document identifier 412 from a corresponding IP document (e.g., U.S. Patent Number) into the administrative legal database 116 (e.g., USPTO patent database), as represented by process flow arrow 1. In response, ownership information 414 (e.g., patent assignee name) and category information 416 (e.g., patent classification) are returned from the administrative database 116, as represented by process flow arrows 2. Next, the ownership and category information is input to the database 116 (as represented by process flow arrow 3) and used to acquire additional IP documents 418 in that category, as represented by process flow arrow 4. Ownership information 420 is then acquired for these additional IP documents, as represented by process flow arrow 6. With the various portions of information, the method 410 generates the landscape analysis item 128 of the graphic 120 (FIG. 1).

One example landscape analysis item 128 is depicted as graphic element 430. The landscape graphic element 430 presents information in two dimensions over a third, time-based dimension. In the example of FIG. 4, for purposes of discussion, the IP document and graphic element pertain patents, and hence the information is for a single independent claim (e.g., claim 1) or multiple independent claims in a series of patents within a class. The information is plotted as the number of unique words in each claim (with optional filtering) along the x-axis versus the total number of words in the claim along the y-axis. In general, many believe that a claim with fewer total words tends to be broader in scope. It is noted that this is just one proxy for claim scope, and others may be employed. The claims are grouped temporarily into four different grids, with each grid representing a different time frame in which the patent issued. In grid 432, the points represent claims that were issued before 1990. In the second grid 434, the points represent claims that were issued in the timeframe of 1990 to 1995. In the third grid 436, the points represent claims that were issued in the timeframe of 1995 to 2000, and the fourth grid 438 shows claims issued after 2000. As described herein, an exemplary technique considers total words for a claim in conjunction with unique words. As indicated in the graphic element 430, trends become apparent. In the shaded grid 434, an arrow 440 is depicted to indicate the point corresponding to the subject IP document being analyzed as part of the method 410.

The time periods allow one to see changes in the number of patents issued with respect to time, for example, as a technology develops. Further, trends become apparent as the points cluster with outliers. Such data is amenable to further analysis using statistical techniques. The class "fingerprint" facilitates review as it provides a framework for systematic analysis of claims. For example, a person or algorithm may commence an analysis at the lower left (fewer unique words and fewer total words). Such claims may have a tendency to be broader in scope or, in other words, a probability analysis may show that claims in the lower left have a greater chance of being broader than claims in the upper right. Where the number of patents is large (e.g., thousands), such an approach can help manage patent assessment in a more systematic manner (e.g., for valuation, litigation risk, product clearance, etc.).

As described herein, a formula 450 may be used to characterize a claim or "fingerprint" a claim. In the example of FIG. 4, the formula 450 includes a semantic analysis for unique words, with optional filtering to remove words such as "a", "the", "and" and the like.

Figure 5:
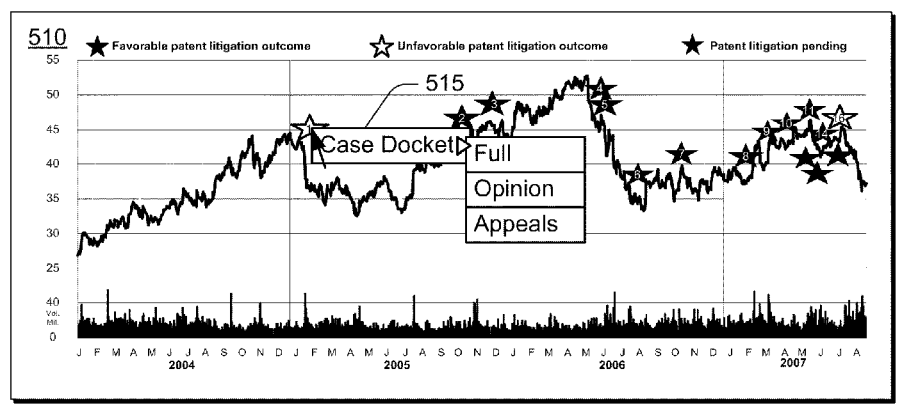
FIG. 5 shows an exemplary graphical display of stock information and litigation events along with an optional menu for linking to additional information such as docket information for a litigation event.

FIG. 5 shows an exemplary graphical display of stock information and litigation events 510 along with an optional menu for linking to additional information such as docket information for a litigation event 515. As already mentioned, such information may be part of a graphic such as the graphic 120 and/or the graphic 1600. The technique of FIG. 5 may be applied in other areas aside from patents and patent litigation whereby a link exists between litigation information and stock information. In particular, where a link exists between stock information and a database such as the PACER database. The PACER Service Center is the Federal Judiciary's centralized registration, billing, and technical support center for electronic access to U.S. District, Bankruptcy, and Appellate court records (http://pacer.psc.uscourts.gov/). It includes Digital Audio Recordings Pilot, Federal Case Statistics, Policies and Procedures, Written Opinions, and other information.

Figure 6:
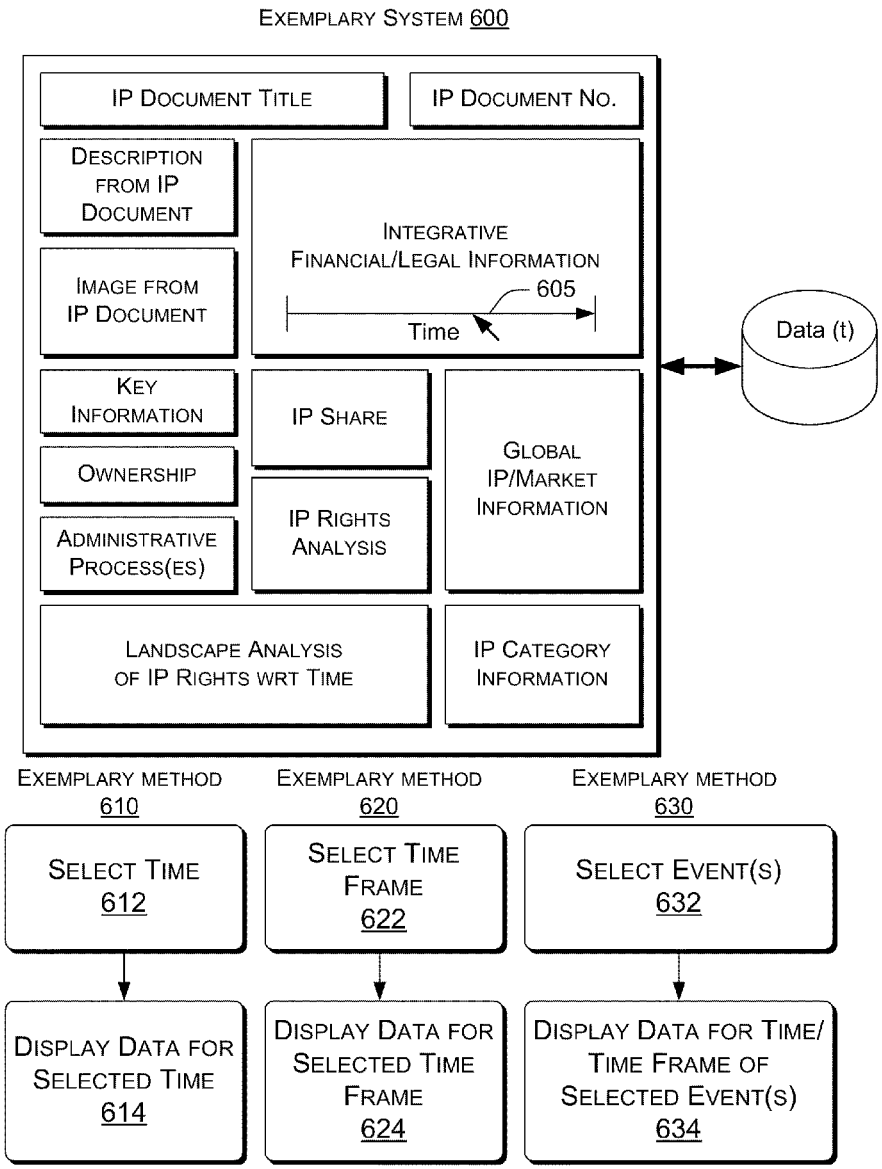
FIG. 6 shows an exemplary system and various associated exemplary methods for selecting a time, a time frame, an event or events and graphically displaying information associated with the selected time, the selected time frame, the selected event or the selected events.

FIG. 6 shows an exemplary system 600 and various associated exemplary methods 610, 620, and 630 for selecting a time, a time frame, an event or events and graphically displaying information associated with the selected time, the selected time frame, the selected event or the selected events. The graphic includes features of the graphic 120 of FIG. 1 (and/or features of the graphic 1600) along with a timeline control 605 that can cause display of certain data. It is noted that the timeline control 605 may be separate from the IP document or UI graphic.

The method 610 includes selecting a time 612 on the timeline and then displaying data for the selected time 614 for one or more of the items in the graphic. The method 620 includes selecting a time frame 622 on the timeline and then displaying data for the selected time frame 2024 for one or more of the items in the graphic. The method 630 includes selecting one or more events 632 from a graphic item and then displaying data for the selected event(s) 634 for one or more of the items in the graphic.

Figure 7:
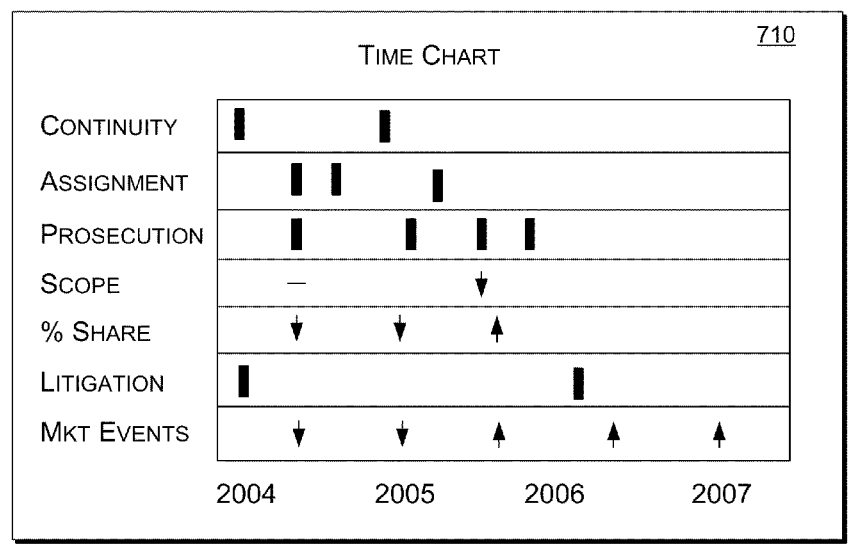
FIG. 7 shows an exemplary graphical display and an optional exemplary menu feature for the graphical display, optionally for a computer-implemented embodiment, where a variety of information associated, directly and/or indirectly, with a patent document is displayed along a time line.
Figure 7:
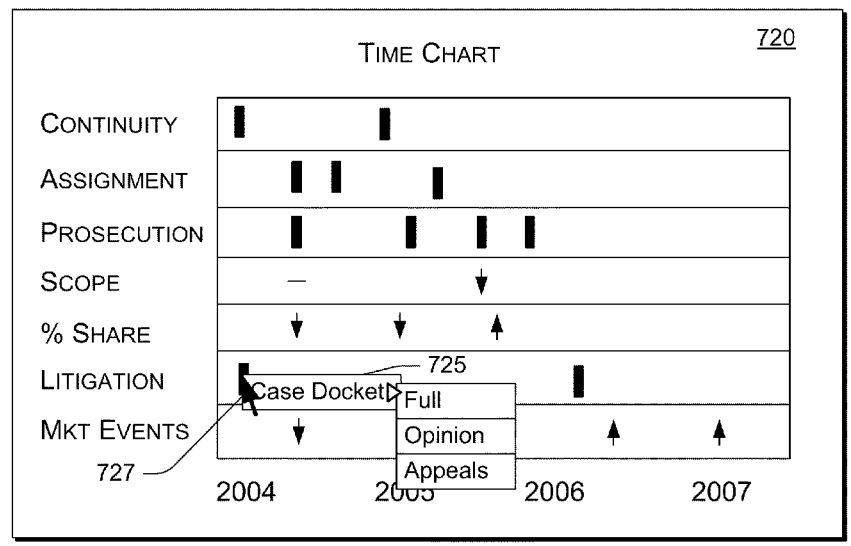

FIG. 7 shows an exemplary graphical display 710 and an optional exemplary menu feature 725 for the graphical display 720, optionally for a computer-implemented embodiment, where a variety of information associated, directly and/or indirectly, with a patent document is displayed along a time line.

In the example of FIG. 7, the time chart 710 includes a series of categories associated with a patent document and ownership of the patent document together with events in the categories over a common timeline. The time chart 720 includes active controls to access information for events in one or more of the categories. For instance, menu feature 725 appears when the user hovers over or otherwise selects the litigation docket event referenced by the pointer 727. The menu allows the user to link to the docket item associated with that litigation event, and read the full text or portions thereof.

Figure 8:
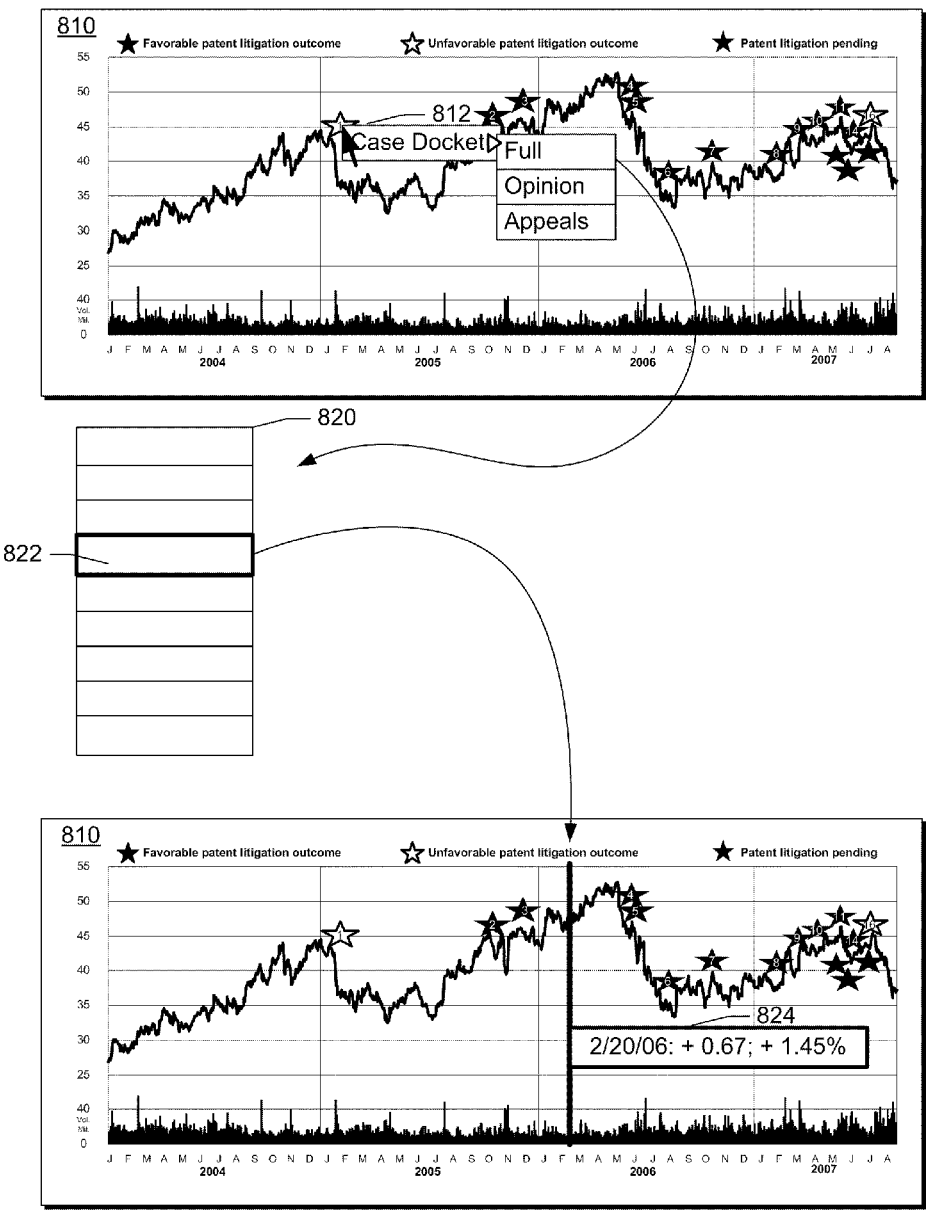
FIG. 8 shows an exemplary method for linking financial information and docket information.

FIG. 8 shows an exemplary method 800 that includes a chart of financial information 810 and a menu 812 (e.g., active control) that allows a user to access a docket 820. The user may then select one or more items on the docket 820 and, in turn, information about the items (e.g., dates and/or other information) is displayed on the chart of financial information 810 (shown reproduced as the lower chart) optionally along with additional information 824 such as performance on a stock on the date of a docket event. For example, when the user selects a docket item 822 on Feb. 20, 2006, the stock was up $0.67, which was 1.45%, as represented in the lower rendition of the chart 810. A user may scroll down docket events or select a series of docket events and then view stock performance (or other financial information such as volume, options, etc.).

Figure 9:
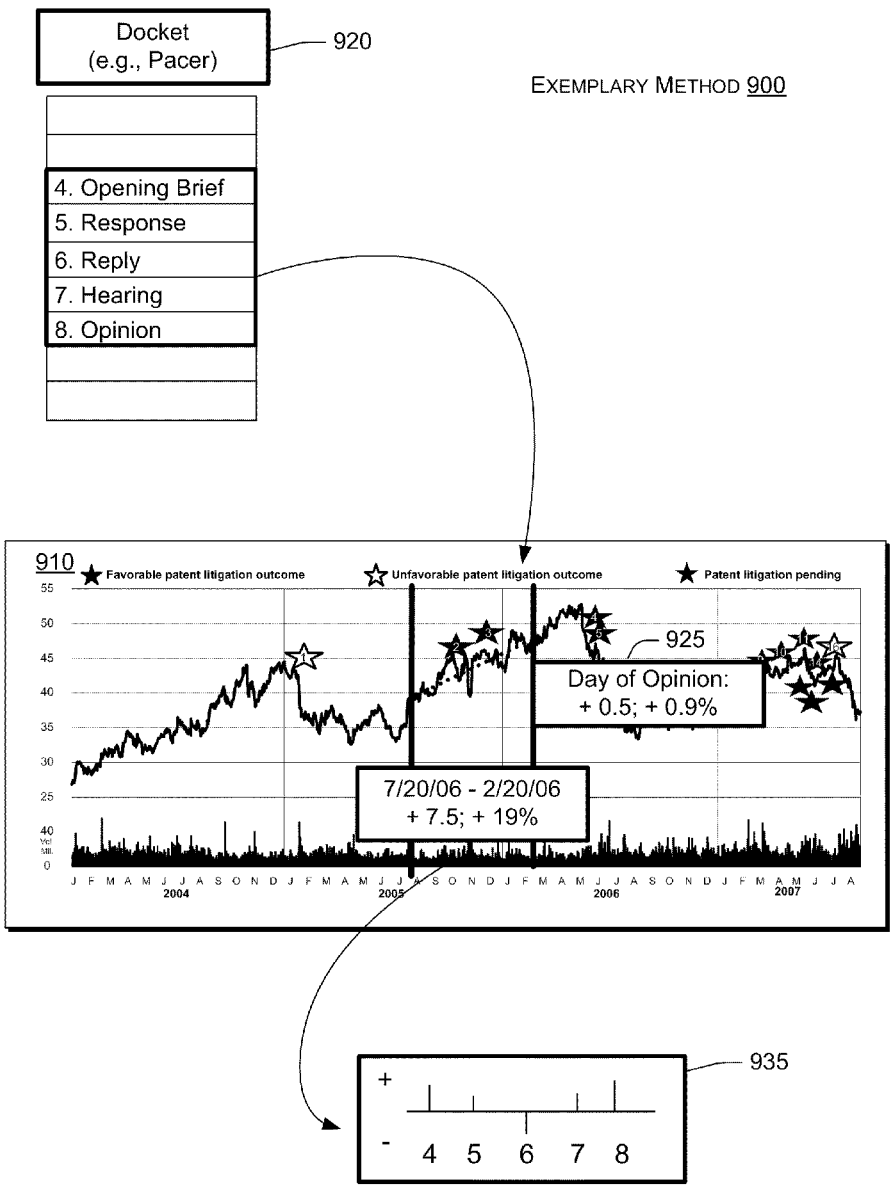
FIG. 9 shows an exemplary method for linking docket information and financial information and for optionally performing an analysis for timing of one or more docket events with respect to financial information.

FIG. 9 shows an exemplary method 900 that includes a chart of financial information 910 and a docket 920. As already explained, a user may select one or more items on the docket 920 and, in turn, information about the items (e.g., dates and/or other information) is displayed on the chart of financial information 910 optionally along with additional information 925 such as performance on a stock on the date of a docket event. For example, where docket events span from Jul. 20, 2006 to Feb. 20, 2006, the stock was up $7.5, which was 19%. On the day of an opinion from a judge in the docket matter, the stock was up 0.5, which was 0.9%. In addition, an optional analysis may be performed such as a regression analysis (e.g., linear, exponential, etc.) for the time period of the docket events selected. This is shown as a dashed line in the chart 910.

An exemplary method may provide a breakdown of financial events and docket events. For example, in FIG. 9, a box 935 presents analysis results where a one to one correspondence of docket events and stock events is presented. In this example, each docket event has a data and information for the stock performance is given as an up or down indicator from a baseline. A baseline may be established using a standard index, a competitor stock, a litigant's stock, etc. Such a presentation allows a user to uncover possible reactions to docket events. In the box 935, the opinion date corresponds to the highest positive move of stock price over the period of the selected docket events.

Figure 10:
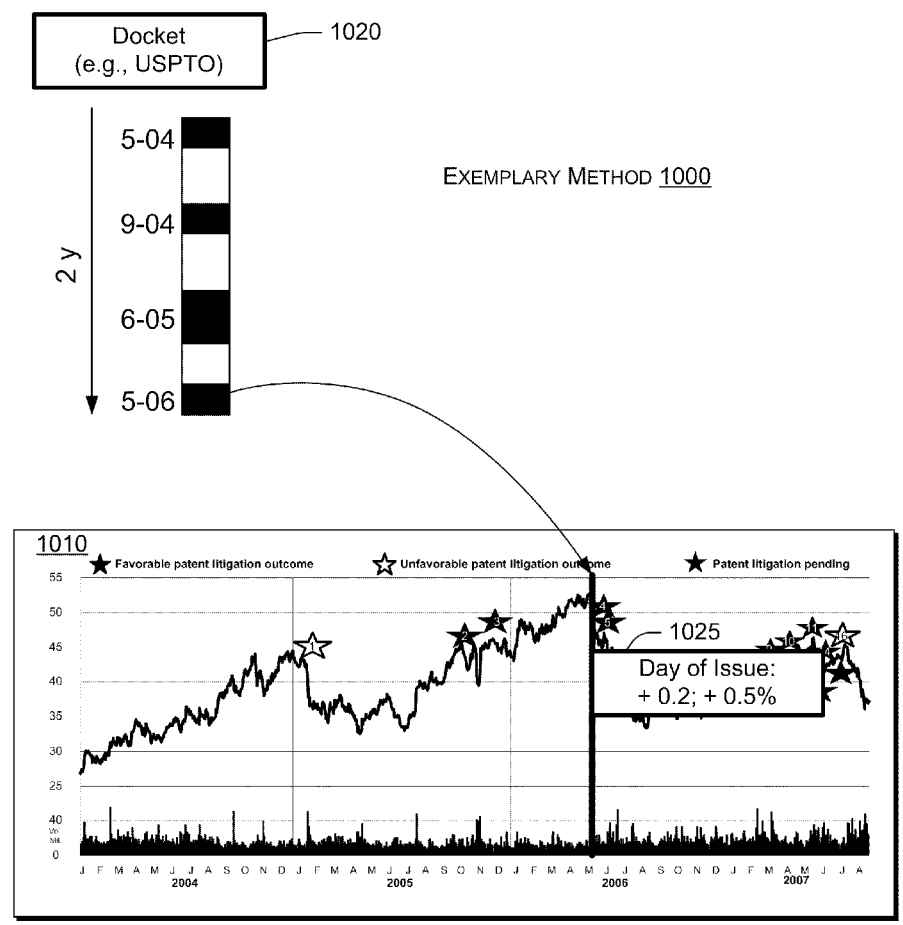
FIG. 10 shows an exemplary method for linking financial information and docket information for a patent prosecution docket.

FIG. 10 shows an exemplary method 1000 where a patent prosecution docket 1020 is displayed and where a user may select any event on the docket (or events) and cause information to be displayed along with financial information. For example, in FIG. 10, the date of issue of the patent may be May 23, 2006 (acknowledging that issued patents generally publish on Tuesdays in the United States). The chart 1010 shows a moniker with "Date of Issue" for Tuesday, May 23, 2006 along with stock price information (e.g., +0.2, +0.5%). In this manner, a user can see if, perhaps, patent issuance had an effect on stock price. Where a company is listed on more than one exchange, then price information for multiple exchanges may be displayed. Also, volume and/or other financial information may be displayed as related to information from the docket 1020.

Figure 11:
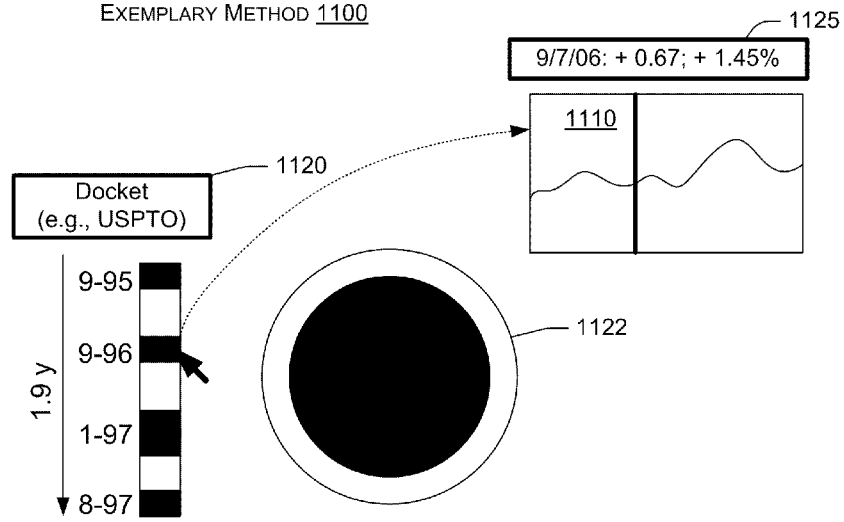
FIG. 11 shows an exemplary method for linking financial information and docket information for a patent prosecution docket along with claim scope information.
Figure 11:
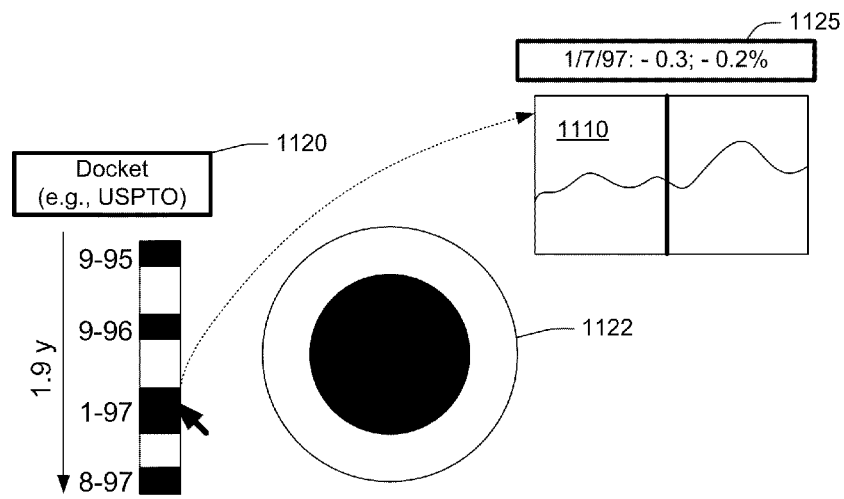

FIG. 11 shows an exemplary method 1100 that includes a patent prosecution docket 1120 in combination with a graphic 1122 that represents scope of a claim and a financial chart 1110 and additional information 1125. An exemplary method allows a user to select a docket event from a docket 1120 and display claim scope information 1122 for that docket event as well as financial information 1125 for the day of the docket event.

Figure 12:
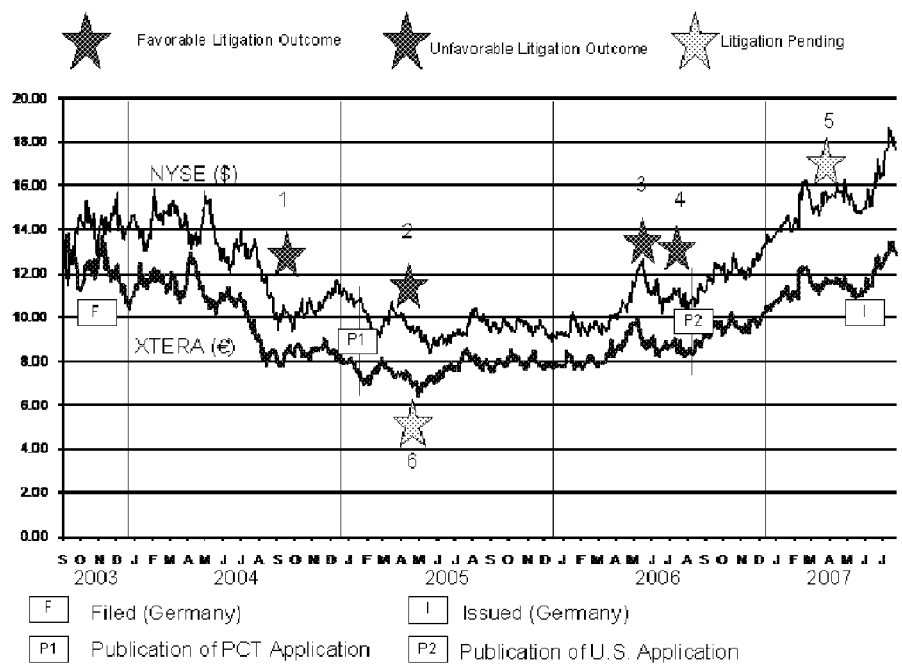
FIG. 12 shows an exemplary graphical display for a company listed on two or more exchanges along with litigation events for one or more jurisdiction (e.g., US and foreign jurisdictions where one of the exchanges is outside the US)

FIG. 12 shows an exemplary graphical display and method 1200 for a company listed on two or more exchanges along with litigation events for one or more jurisdiction (e.g., US and foreign jurisdictions where one of the exchanges is outside the US). In the example of FIG. 12, the graphic 1200 also includes information as to filing, publication and issuance of patent documents in more than one jurisdiction. A user may select an event listed in the graphic 1200 and display an associated docket. In turn, upon selection of a docket event or events, information may be displayed with respect to, for example, financial performance of the stock as traded on one or more exchanges.

Figure 13:
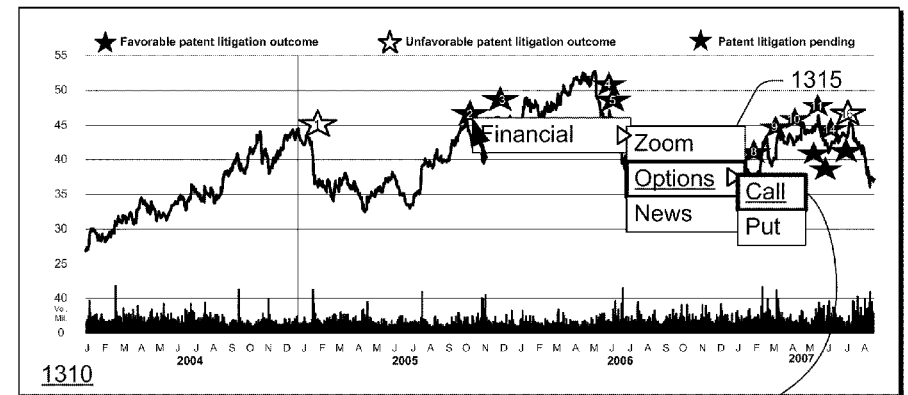
FIG. 13 shows an exemplary graphical display of financial information along with a menu for linking to additional financial information along with an analysis option.

FIG. 13 shows an exemplary graphical display 1300 of financial information along with a menu for linking to additional financial information 1320. In this example, the graphic 1310 includes litigation information and stock information. The menu 1315 allows for zooming or other display (e.g., around a litigation event) and/or display of options (e.g., puts/calls) and/or news. An analysis button 1340 allows for further analysis of the information.

Figure 14:
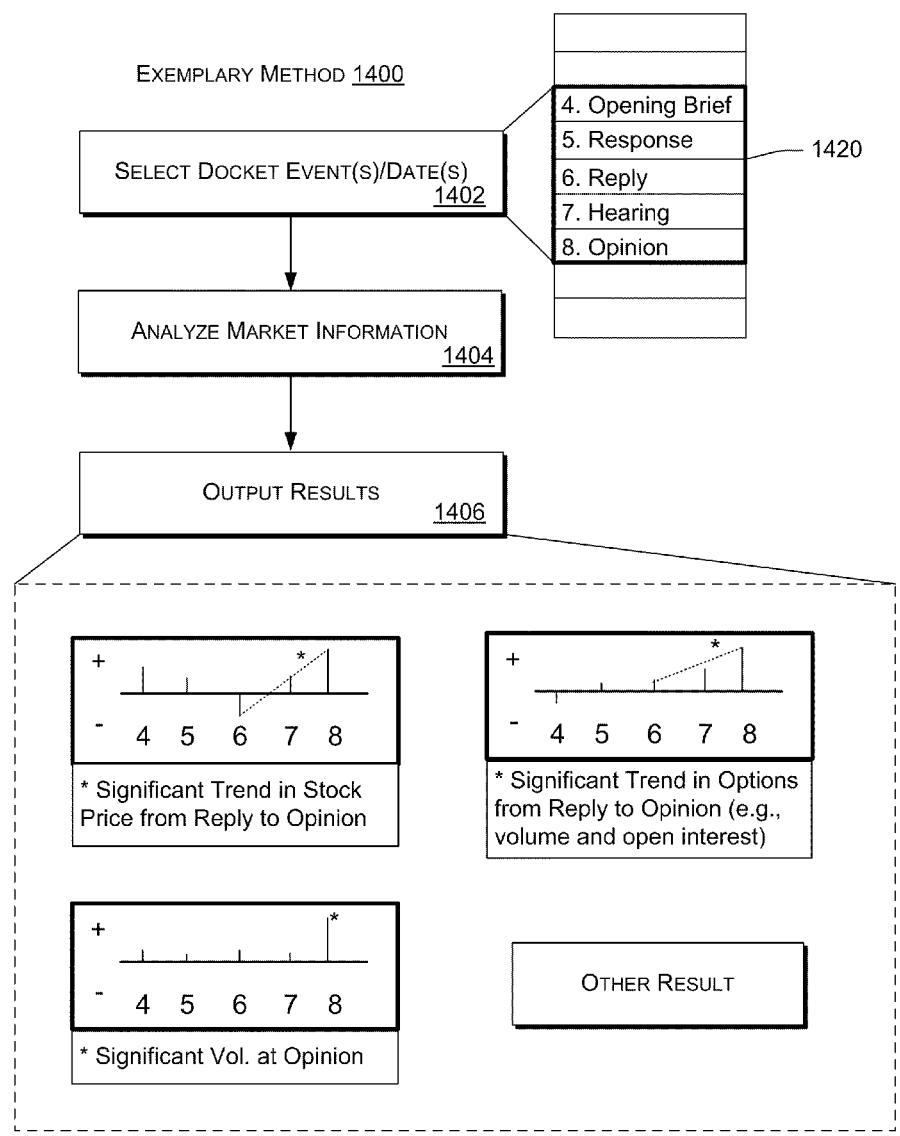
FIG. 14 shows an exemplary method for selecting one or more docket events or items, analyzing market information and outputting results from the analysis.

FIG. 14 shows an exemplary method 1400 for analyzing market information upon selection of one or more docket event and/or one or more dates. A selection block 1402 allows a user to make a selection. An analysis block 1404 analyzes market information with respect to the selection. An output block 1406 outputs results from the analysis. In the example of FIG. 14, the results include trend information with respect to one or more docket events. As described herein, such information may be used in making decisions with respect to financial markets.

Figure 15:
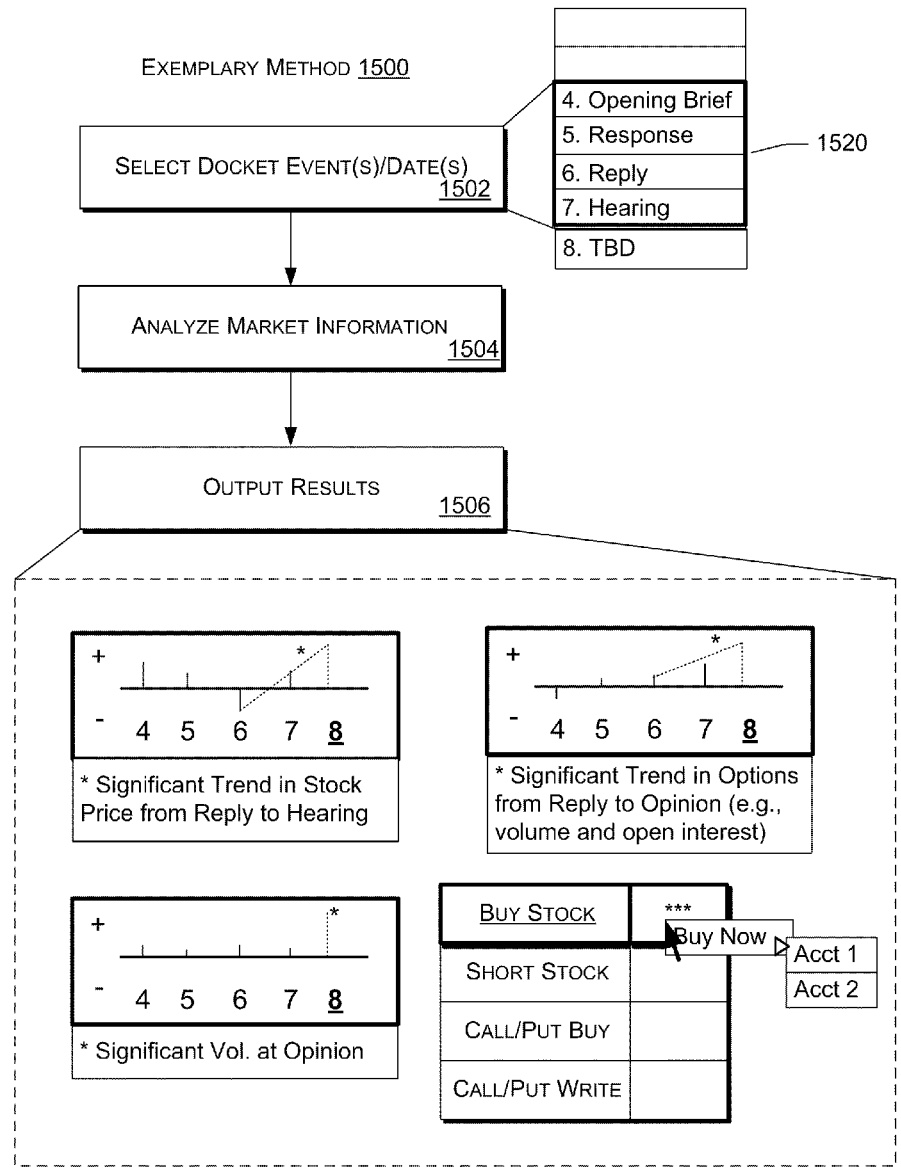
FIG. 15 shows an exemplary method for selecting one or more docket events or items, analyzing market information and outputting results from the analysis along with one or more recommended actions with respect to a financial market.

FIG. 15 shows an exemplary method 1500 for analyzing market information upon selection of one or more docket event and/or one or more dates. A selection block 1502 allows a user to make a selection. An analysis block 1504 analyzes market information with respect to the selection. An output block 1506 outputs results from the analysis.

In the example of FIG. 15, the results include trend information with respect to one or more docket events and optionally with respect to a possible future docket event. As described herein, such information may be used in making decisions with respect to financial markets, as indicated by the menu "Buy Now" where a fly out may list one or more accounts to use for taking action with respect to a stock and/or options. In the particular example of FIG. 15, a recommendation appears next to an action (e.g., ***) which can be an indicator of probability that such an action will have a favorable financial return.

In the example of FIG. 15, trends are shown with respect to a baseline. Other techniques may be used to correlate docket events with financial information to allow a user to make a decision with respect to a financial instrument. In addition, as shown in FIG. 15, a user may see the results and, on a common interface, select an action. Overall, such an interface allows a user to act promptly in response to a docket event. As the old saying goes: "Time is money"; such a method and/or system for implementing the method, can allow a user to act advantageously and quickly in response to one or more docket events and/or trends that may exist with respect to docket matter.

In the example of FIG. 15, the actions may be linked to appropriate mechanisms to take the underlying action. For example, a link to a brokerage service may exist.

An exemplary system for brokerage services includes an application programming interface that allows an application that implements the method 1500 to interact with the brokerage service. For example, such an API may provide for secure transactions with the application.

An exemplary system for brokerage services includes an application programming interface that allows an application that implements the method 1500 to interact with the brokerage service. For example, such an API may provide for secure transactions with the application.

The method 1500 may display a docket and financial information along with recommendations on a common interface. A system to implement such a method may include a computing device on a client side (e.g., desktop, handheld, etc.) that allows a user to take actions. Such a computing device may operate wirelessly.

FIG. 16 is an example of an exemplary integrated document for a single patent 1600. The graphic 1600 includes financial information and litigation information as well as global information (e.g., information from one or more jurisdictions outside the United States). Global information may include market information for products/services, dispute information (e.g., mediation, arbitration, litigation), patent information (e.g., admin. agency, prosecution, etc.). With respect to litigation, administrative appeals, etc., for patent applications may also be included (e.g., matters appealed from the USPTO or other administrative agencies).

The graphic 1600 may be an electronic document with controls for implementing one or more of the exemplary methods described herein. For example, a user may select a prosecution docket event and then the graphic may be updated to show financial information associated with the date of the prosecution event. In addition, a user may select a litigation event on the graphic and, in turn, a docket is displayed for the litigation event. A user may select one or more of the docket events (or items) and then cause an update of the financial graphic to display financial information in association with the one or more selected docket events. In addition, an automatic update may occur in response to a docket event (e.g., prosecution event, litigation event, or other docket event). For example, for a pharmaceutical company, a FDA docket event may issue an alert. In general, pharmaceutical companies rely on patent protection and FDA decision making. Thus, an exemplary graphic may include FDA docket information for such a company.

In general, for litigation matters, a briefing cycle exists: opening brief, response brief, and reply brief. Sometimes a hearing occurs prior to a decision. An exemplary method has a priori knowledge of briefing cycles and may even have a priori knowledge of how a court handles matters (e.g., Rocket Docket). In such a method, once a docket event occurs, the method can update an analysis and issue an alert as to immediate action and/or timed action. Timed action may include "wait until June 27 and then take action X" as a decision on the briefs is likely to be rendered on that day. With respect to action X, this may be to buy a stock, buy calls, etc., depending on an underlying trend in financial data with respect to the docket information.

In patent litigation in the US, a major event is referred to as a Markman hearing. A Markman hearing pertains to claim scope, where a judge decides the claim scope as a matter of law. The opinion issued by a judge as to claim scope can be determinative as to outcome of a patent infringement case at a district court. Thus, in a particular example, the hearing item in the docket 1520 may be a Markman hearing. Information such as the expected date of the opinion is useful information for taking action with respect to financial markets (e.g., for litigants). Where rules and/or behavior of a court and/or a judge are known to some degree a priori, then an exemplary method may recommend taking action at a particular time and/or taking a particular action in a financial market.

While various examples pertain to dockets that may be available electronically, other dockets and/or events may be used. For example, where a paper publication occurs, then such information may be entered using appropriate scanning and/or hand coding technology. Where an oral event occurs, a person may be present in a court room and then relay the information to a server or datacenter for appropriate distribution. With respect to the latter, at times a judge will render an initial decision orally and then follow with a written order. A person sitting in the court at the time of the oral decision can rely such information (e.g., in the court where permitted or outside of the court) to an appropriate server that can update all users interested in the matter. An exemplary method such as the method 1500 may act automatically upon entry of the information and immediately make a recommendation as to acting with respect to a financial market.

Figure 17:
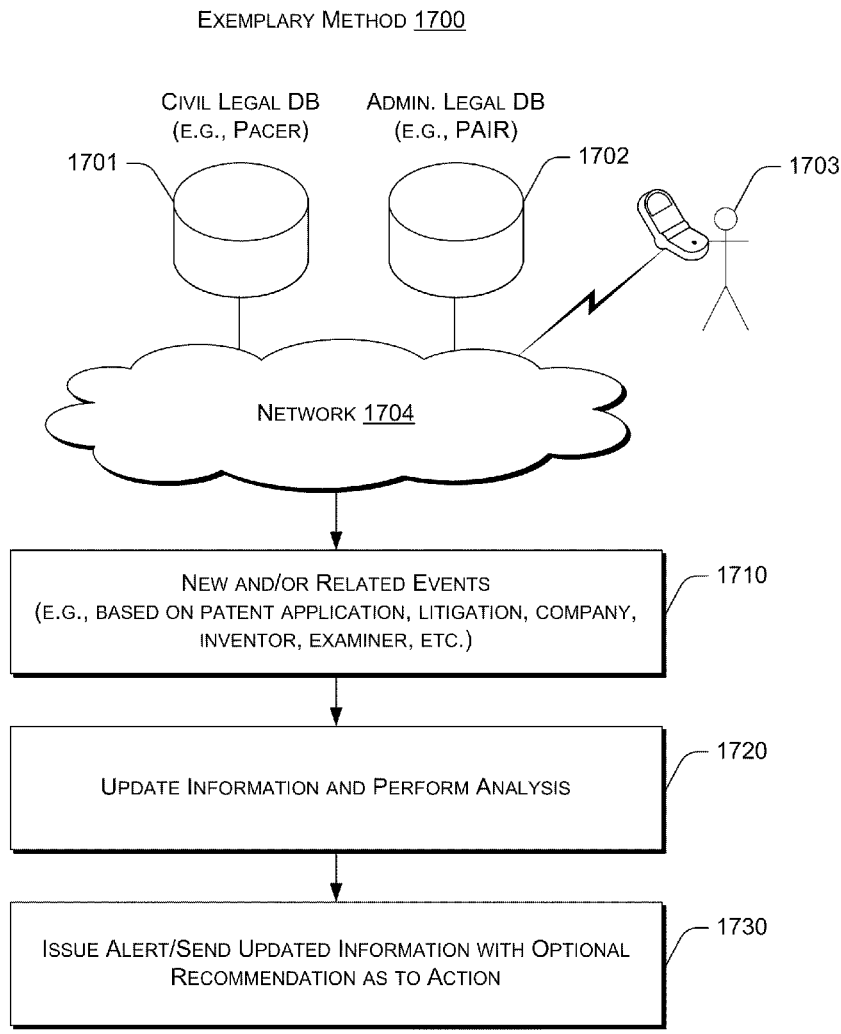
FIG. 17 shows an exemplary method for issuing an alert and/or sending information with an optional recommendation as to action with respect to a financial market.

FIG. 17 shows an exemplary method 1700 where information from a database 1701 such as PACER, a database 1702 such as PAIR and/or a person 1703 (e.g., with a communication device) communicate information via a network 1704 per block 1710. According to the method 1700, the information is updated for users (e.g., subscribers) and an analysis performed with respect to the information per block 1720. Next, the method 1700 issues an alert and/or sends updated information with optionally recommendations as to actions. Such a method may send a recommendation, for example, to buy a stock, shortly after the information is communicated. For example, where the person 1703 is attending a hearing, the user may convey the information about a litigation matter to a server that performs an analysis and then issues an alert to a subscriber with a recommendation. In other scenarios, information may become available from an electronic source (e.g., a docketing system associated with a decision making entity).

As described herein, various exemplary methods, systems, devices, etc., can acquire information from multiple databases and collate in a format (e.g., patent, stock, litigation databases).

Various exemplary methods may be optionally embodied, in whole or in part, as instructions on a computer-readable medium.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A method comprising:
under control of one or more processors configured with executable instructions:
accessing a docket for a decision making governmental entity wherein the docket comprises docket events;
accessing financial information;
associating the financial information with one or more docket events from the docket;
presenting a graphic including the financial information; and
overlaying representations of the one or more docket events on the financial information to determine whether the one or more docket events had an impact on the financial information, to form a recommendation to act.

2. The method of claim 1 wherein the docket comprises a litigation docket.

3. The method of claim 1 wherein the docket comprises a patent prosecution docket.

4. The method of claim 1 wherein the financial information comprises stock prices.

5. The method of claim 1 further comprising presenting a menu of links to additional information about the financial information, the one or more docket events, or both.

6. The method of claim 1 wherein the menu of links to additional information includes links to a litigation docket, a patent prosecution docket, or both.

7. The method of claim 1 further comprising presenting a time control usable to control the graphic to present financial information and one or more docket events for a selected time or a selected time frame.

8. The method of claim 7 further comprising:
receiving selection of a time or a time frame via the time control; and
in response to receiving selection of the time or the time frame, presenting financial information and one or more docket events associated with the selected time or the selected time frame.

9. The method of claim 1 further comprising:
receiving selection of one of the representations of the one or more docket events; and
in response to receiving the selection of one of the representations, presenting categories of information relating to a patent associated with the one or more docket events.

10. The method of claim 9 wherein the categories of information relating to the patent include continuity of the patent, assignment of the patent, prosecution of the patent, scope of the patent, litigation involving the patent, and/or market events relating to the patent.

11. The method of claim 10 further comprising:
receiving selection of one of the categories relating to the patent; and
in response to receiving selection of the category relating to the patent, presenting a document or docket event from the category related to the patent.

12. A method comprising:
under control of one or more processors configured with executable instructions:
accessing a docket for a decision making governmental entity wherein the docket comprises docket events;
accessing financial information;
associating the financial information with one or more docket events from the docket;
presenting a graphic including the financial information and the one or more docket events; and
presenting a time control usable to control the graphic to present financial information and one or more docket events for a selected time or a selected time frame.

13. The method of claim 12 wherein the docket comprises a litigation docket.

14. The method of claim 12 wherein the docket comprises a patent prosecution docket.

15. The method of claim 12 further comprising analyzing the financial information for one or more trends with respect to a series of docket events.

16. A system comprising:
a computing device;
a module operable on the computing device for accessing an electronic docket for a decision making governmental entity, wherein the docket comprises docket events;
a module operable on the computing device for accessing financial information; and
a module operable on the computing device for:
receiving selection of one or more docket events;
analyzing the selected one or more docket events in combination with financial information; and
outputting statistically significant trends in the financial information in relation to times of the selected one or more docket events and/or between times of the selected one or more docket events.

17. The system of claim 16 further comprising a module operable on the computing device for forming a recommendation to act with respect to a financial market based at least in part on an analysis of one or more docket events with respect to financial information.

18. The system of claim 17 further comprising an application programming interface usable by the module operable on the computing device to initiate a transaction with a brokerage service based on the recommendation to act.

19. The system of claim 16 further comprising memory for storing a list of subscribers to a service.

20. The system of claim 16 further comprising memory for storing a list of subscribers to a service in association with a docket number for an electronic docket.

21. The system of claim 16 further comprising memory for storing a list of subscribers to a service in association with a docket number for an electronic docket and in association with a publicly traded company.

22. The system of claim 16 further comprising memory for storing a list of subscribers to a service in association with a docket number for an electronic docket and in association with a financial exchange symbol for a publicly traded company.

* * * * *